REPLACEMENT FLUSH VALVE
Original Filed June 30, 1964 2 Sheets-Sheet 1
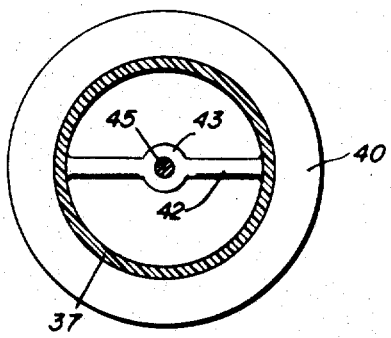
FIG. 3
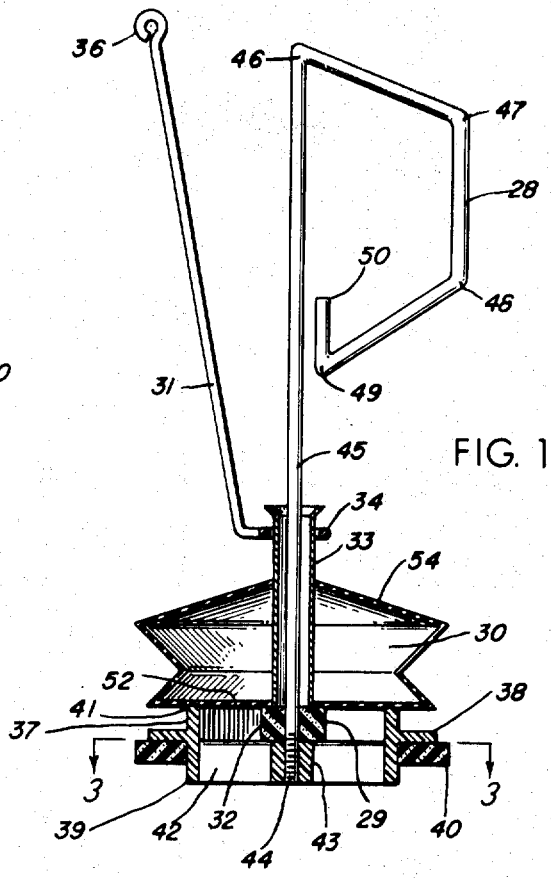
FIG. 1
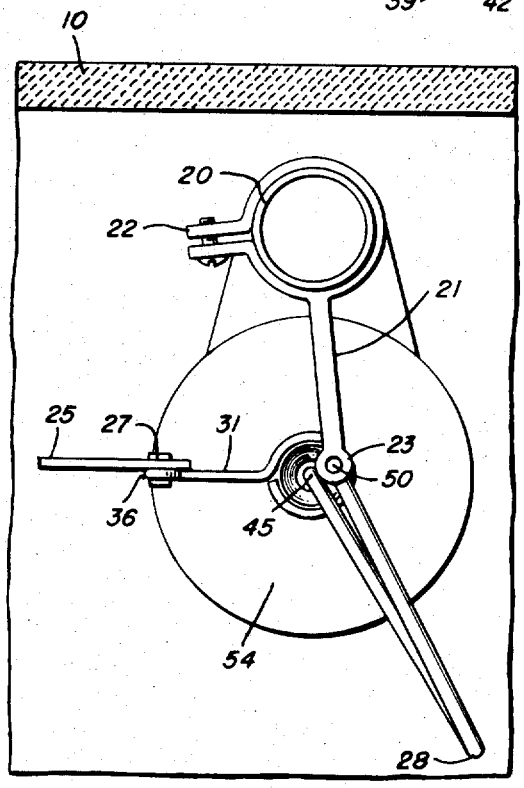
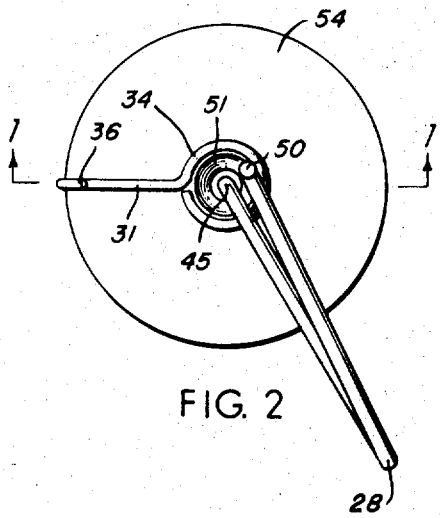
FIG. 2
FIG. 4
INVENTOR.
PHILLIP J. BREWINGTON
BY Henry H. Snelling

REPLACEMENT FLUSH VALVE

Original Filed June 30, 1964 2 Sheets-Sheet 2

INVENTOR.
PHILLIP J. BREWINGTON
BY Henry H. Snelling

United States Patent Office

Re. 27,105
Reissued Mar. 30, 1971

27,105
REPLACEMENT FLUSH VALVE

Phillip J. Brewington, 6902 Manchana Road,
Austin, Tex. 78745

Original No. 3,263,240, dated Aug. 2, 1966, Ser. No. 379,311, June 30, 1964. Application for reissue July 12, 1968, Ser. No. 747,027
Int. Cl. E03d *1/34*
U.S. Cl. 4—57 5 Claims

Matter enclosed in heavy brackets [ ] appears in the original patent but forms no part of this reissue specification; matter printed in italics indicates the additions made by reissue.

*ABSTRACT OF THE DISCLOSURE*

*Disclosed is a replacement flush valve assembly to replace a worn ball closure and add a new valve seat, while retaining the old valve seat and including a new ball closure. The assembly has a member coaxial with the old valve seat and the outlet closure pipe to receive the new ball closure and a P-shaped spring means to resiliently urge the replacement seat toward said retained valve seat.*

This invention relates to replacement flush valves and has for its principal object the provision of an assembly which can accurately and quickly be installed over an existing flush valve seat by an ordinary person with no previous experience.

Another object of the invention is to provide a replacement flush valve which is simple, inexpensive, durable and unlikely to get out of order.

A further object of the invention is to provide a device which can be installed in the majority of water closets with no adjustment to the old valve and in which the new seat is spring-pressed into contact with the old seat.

In the drawings:

FIG. 1 is an elevation of the device as sold, certain of the portions being in section.

FIG. 2 is a top plan view.

FIG. 3 is a section on line 3—3 of FIG. 1.

FIG. 4 is a view similar to FIG. 2, but showing the outlet and overflow pipes as well as the usual bracket clamped to the overflow pipe.

Figure 5:
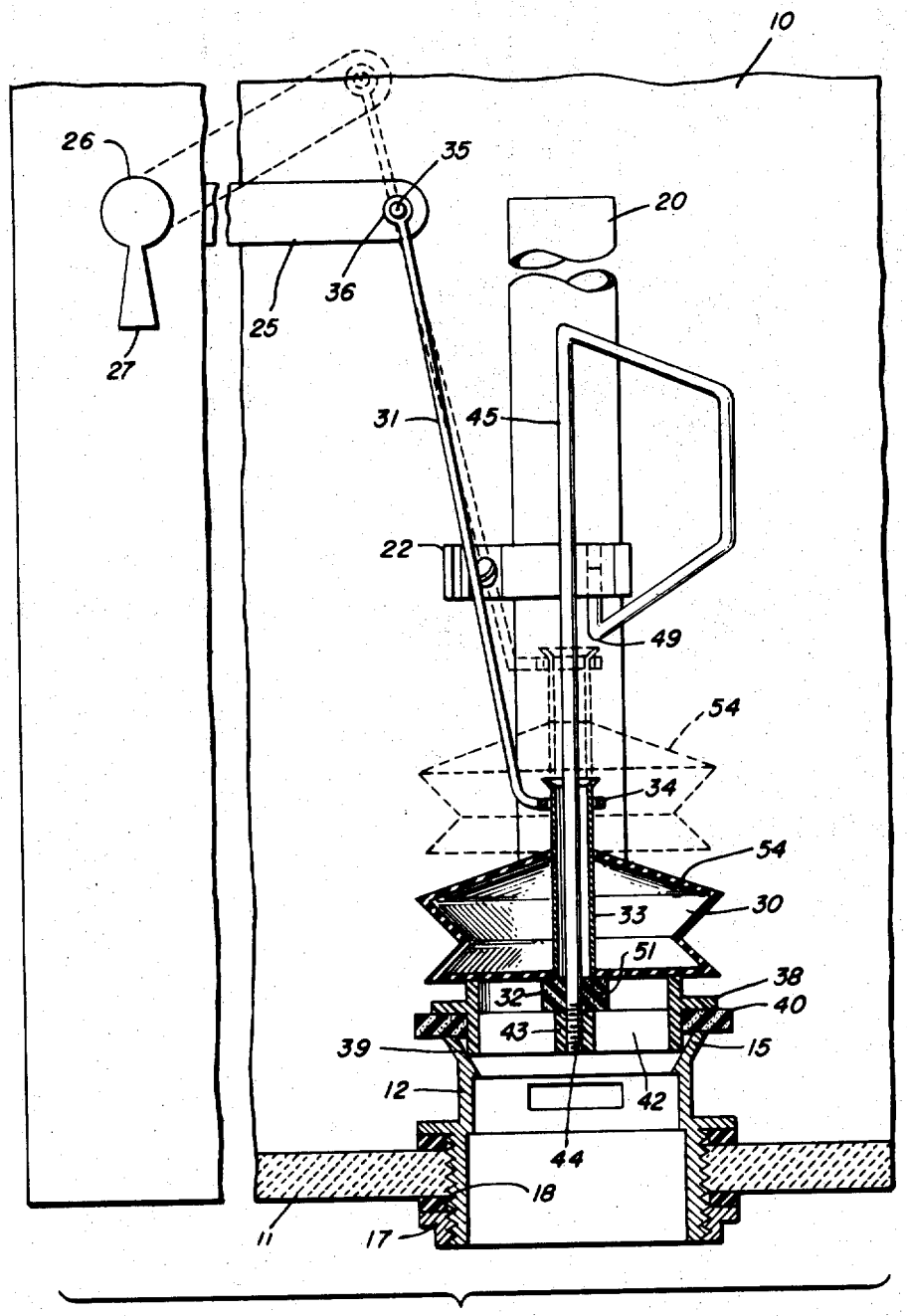
FIG. 5 is an elevation, partly in section, showing the replacement assembly as installed.

Referring to FIG. 5 first, showing the assembly as installed in a typical toilet flush tank, the old parts which will be retained after disposing of the worn ball and its vertical stem are: the tank 10 having a bottom 11 in which the outlet pipe 12 with its worn tapered seat 15 is held by the usual flange 16 and nut 17 and which is secured against leakage by the rubber gaskets 18; the overflow pipe 20 and the bracket 21 (FIG. 4) clamped as at 22 at right angles to the bracket portion which has on its free end a guide 23 for the discarded stem of the worn ball. This bracket is retained as it furnishes a convenient anchor for the spring which holds the new assembly in place. The means for raising the old ball is also retained as the function is the same and may be of any of the usual forms including a chain or a wire, etc. This well-known means is illustrated as having a link 25 on shaft 26 with lever or handle 27 controlling the manual lifting of the new flush ball 30 by a connection 31 which may be a wire curled around the top of the tube 33 as at 34 and around the pin 35 at the end of link 25 as at 36.

The replacement assembly as furnished is shown in

FIGS. 1 to 4. This includes the cylindrical portion 37 of the valve seat member flanged as at 38 and with its lower rim 39 well free of engagement with the old seat 15 so that the large gasket 40, preferably secured to the flange 38, resists the downward spring pressure described later. The cylindrical portion 37 has a valve seat 41 at its top and has centrally a strut 42 (FIG. 3) with an enlargement 43 tapped to receive the threaded lower end 44 of the stem 45 of a P-shaped element of spring metal anchored in the opening of the formerly used guide end 23 of the bracket 21. The P-shaped element is bent as at 46, 47, 48, 49 so that the stem 45, the mid-section 28 and the upstanding short anchor portion 50 are parallel so that the new valve seat member 37 is firmly held in place between the threaded strut 42 and the bracket 21, thus compressing the large rubber gasket 40. By pulling down the short anchoring portion 50 to free it from bracket 21, the entire assembly can easily be lifted out and as readily be installed by placing it over the old valve seat and then lowering the tube 33 in the ball 30 until the tube bottom 29 touches the small rubber washer 32 thus preventing leakage through the tube 33.

The flush ball or valve closure 10 includes a seat engaging member 52 preferably flat, but which may be slightly conical, and a central metal tube 33 having a flaring upper end 51 to form a stop for the connection 31 which, when not of wire, may be slipped on the tube before the latter is placed in the ball where it is frictionally held in adjusted position. Since the seat engaging member 52 rests upon new seat 41 quite well inward of the periphery of the ball at that level, the water pressure on the flexible lip of the ball will insure against leakage even if the stem 45 is not precisely vertical.

What is claimed is:

1. A toilet flush valve assembly to replace a worn ball closure and add a new valve seat, while retaining the old valve seat comprising a new ball closure, a member coaxial with the old seat and the outlet closure pipe and having at its upper surface a replacement seat to receive the new ball closure and means adapted to resiliently urge the replacement seat toward the retained valve seat, said urging means comprising a spring adapted to be secured at one end to the coaxial member and detachably anchored at the other end in a retained guide bracket formerly used to guide the stem of the worn valve closure.

2. The assembly of claim 1 in which an upwardly directed portion of the spring loosely enters the guiding opening of the bracket.

3. The assembly of claim 1 in which the spring has a threaded connection with a portion of the coaxial member.

4. The assembly of claim 1 in which the spring is P-shaped, the coaxial member has a central strut, and the spring has a threaded connection with the strut.

*5. A replacement flush valve assembly to be used in conjunction with a worn valve seat, comprising:*

*(a) a replacement seat member supported by and coaxial with said worn valve seat, said replacement member including a pair of concentrically disposed annular rims joined together by a strut, said pair of concentric rims having an opening therebetween through which water may flow,*

*(b) a valve closure member having a substantially flat lower surface for engaging the outer one of said concentrically disposed rims, the said engaging surface of said valve closure member overhanging said outer rim,*

*(c) a guide stem secured in an opening defined by said inner rim, said guid stem extending through said new valve closure member and providing a guide during the raising and lowering of said valve closure member, and*

(*d*) *means for retaining said replacement seat member against said worn valve seat.*

References Cited

The following references, cited by the Examiner, are of record in the patented file of this patent or the original patent.

UNITED STATES PATENTS

| | | | |
|---|---|---|---|
| 1,064,621 | 6/1913 | De Rosa | 4—60 |
| 2,011,782 | 8/1935 | Teahen | 4—56 |

| | | | |
|---|---|---|---|
| 2,190,147 | 2/1940 | Ciaccio et al. | 4—57UX |
| 2,277,388 | 3/1942 | Clark | 4—57 |
| 2,693,601 | 11/1954 | Smith | 4—58 |
| 2,735,112 | 2/1956 | Myers | 4—57 |
| 2,907,050 | 10/1959 | Harris | 4—56 |
| 3,108,287 | 10/1963 | Stallworth | 4—56 |
| 3,121,234 | 2/1964 | Micek | 4—56 |

LAVERNE D. GEIGER, Primary Examiner

H. K. ARTIS, Assistant Examiner